United States Patent Office 3,533,588
Patented Oct. 13, 1970

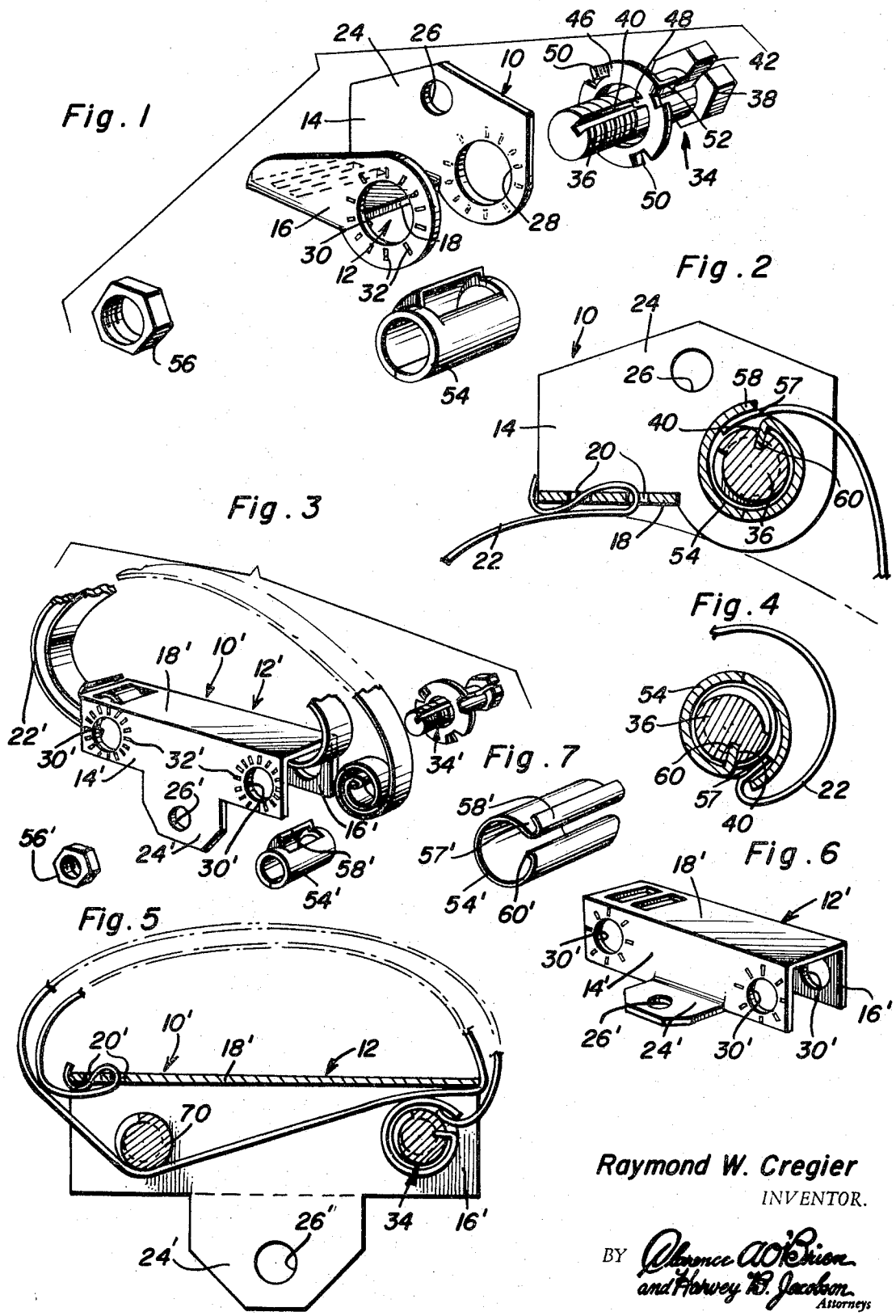

3,533,588
MOUNTING BRACKET WITH BANDING STRUCTURE
Raymond W. Cregier, Rte. 1, Box 430,
Port Orchard, Wash. 98366
Filed Aug. 19, 1968, Ser. No. 753,488
Int. Cl. F16m 13/00
U.S. Cl. 248—309            11 Claims

ABSTRACT OF THE DISCLOSURE

A bracket structure for securement to a suitable mounting surface and including an elongated base with anchoring structure at a first end thereof and a winding member at the second end thereof. An elongated flexible tension member is provided and one end is interlockingly engaged with the anchoring structure while the other end of the tension member is anchored to the winding member for winding thereon, whereby various materials may be secured, by banding, to the base by tensioning the tension member about such material.

---

The mounting bracket of the instant invention has been specifically designed to provide a means whereby various materials may be supported from suitable support surfaces. Each form of mounting bracket may be utilized solely to secure a plurality of various members together by banding and each form of the mounting bracket specifically illustrated and described hereinafter is adapted for securement to a suitable supporting surface in at least one particular manner.

Each form of mounting bracket includes, as its elongated flexible tension member, a conventional metallic band and the anchoring portion of the mounting bracket to which one end of the band may be anchored as well as the winding member to which the other end of the tension member or band may be secured for winding thereon is formed in a manner whereby preforming of the band for securement to the anchoring structure and winding member is not required.

The main object of this invention is to provide a mounting bracket which will not only be adapted for securing various articles together, by banding, but which will also be adapted for ready securement to substantially any suitable supporting surface.

Another object of this invention is to provide a bracket structure in accordance with the preceding object and including structural features thereof adapting the bracket structure for securement to a suitable supporting surface in various manners.

Yet another object of this invention is to provide a bracket structure for banding a plurality of articles together and adapted to utilize a conventional metallic banding strap with the bracket structure requiring no pre-forming of the end portions of the metallic band for operative association with the bracket structure.

A final object of this invention to be specifically enumerated herein is to provide a bracket structure in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is an exploded perspective view of one form of bracket structure constructed in accordance with the present invention;

FIG. 2 is an enlarged longitudinal vertical sectional view taken substantially upon a plane passing through the center of a bracket structure such as that illustrated in FIG. 1 but in assembled condition and operatively associated with a conventional metallic band prior to one end portion of the band being wound on the winding member of the bracket;

FIG. 3 is an exploded perspective view of a second form of bracket structure;

FIG. 4 is a fragmentary longitudinal vertical sectional view illustrating the manner in which the winding member and sleeve portion supported therefrom coact to form a tangential opening recess or pocket in which to receive one end of the associated metallic band and illustrating the one end of the band in a bent condition upon initial winding of the winding member subsequent to engagement of the band therewith;

FIG. 5 is a longitudinal vertical sectional view taken substantially upon a plane passing along the longitudinal center line of the base or base portion of the bracket structure illustrated in FIG. 3;

FIG. 6 is a perspective view of the base or base portion of the bracket structure illustrated in FIGS. 3 and 5 with the mounting flange portions thereof bent into coplanar relation; and FIG. 7 is a perspective view of a modified form of winding sleeve which may be utilized in lieu of the winding sleeves illustrated in FIGS. 1–4 and keyed with the shank-type winding member.

Referring now more specifically to the drawings the numeral 10 generally designates a first form of bracket structure constructed in accordance with the present invention. The bracket structure 10 includes an elongated base referred to in general by the reference numeral 12 which is generally U-shaped in transverse cross-sectional shape and includes a pair of generally parallel opposite side flanges 14 and 16 interconnected by means of a bight portion 18. The bight portion 18 includes a pair of longitudinally spaced transversely extending slots 20 by which one end of a metallic band or banding member 22 may be secured to the bight portion 18 in a manner which is believed to be obvious from FIG. 2 of the drawings.

The flange 14 includes an extension 24 having an aperture 26 formed therein whereby the flange 14 may be secured to any suitable supporting surface by means of a fastener (not shown) secured through the aperture 26 and to the supporting surface.

The flanges 14 and 16 include aligned bores 28 and 30 and the remote surfaces of the flanges 14 and 16 are provided with outwardly opening recesses 32 spaced circumferentially about the openings 28 and 30.

A winding member referred to in general by the reference numeral 34 is provided and comprises a shank-type fastener including an externally threaded shank portion having a noncircular head 38 on one end. The shank portion 36 includes a longitudinally extending and radially outwardly opening slot or groove 40 and the slot or groove 40 extends through and therefore includes a portion 42 formed in the head 38.

An annular washer 46 is disposed on the shank portion 34 intermediate the diametrically enlarged head 38 and the flange 24. The washer 46 includes a radially inwardly projecting tongue 48 which is slidingly received in the slot or groove 40 and the outer periphery of the washer 46 includes laterally struck portions 50 disposed circumferentially thereabout defining tongues which are receivable in the recesses 32 formed in the outer surface of the flange 24 to prevent rotation of the washer 46 relative to the flange 24 and thus rotation of the winding member 34 relative to the flange 24. Further, the outer periphery of the washer 46 also includes a laterally struck tongue 52 which is receivable in the portion 42 of the slot or groove 40 and which also serves to key the annulus or washer 46 to the winding member 34 for rotation therewith.

The shank portion 36 is passed through the bores 28 and 30 and a split sleeve 54 is provided and disposed about the shank portion 36. The sleeve 54 is snugly received between the flanges 14 and 16 and a threaded nut 56 is threaded on the end of the shank portion 36 remote from the head 38 outwardly of the flange 16. Of course, the threaded nut 56 may be utilized to draw the head 38 and the annulus or washer 46 toward the outer surface of the flange 14 whereby the laterally struck portions or tongues 50 will be received in the recesses 32 formed in the outer surface of the flange 14 so as to prevent rotation of the shank portion 36 relative to the base 12.

From FIG. 2 of the drawings it may be seen that the free end of the band or banding member 22 remote from the slots 20 is inserted into a generally tangentially opening pocket 57 defined by a portion 58 of the split sleeve 54 spaced intermediate its axial ends which is struck generally radially outwardly. In addition, the split sleeve 54 includes an inwardly struck portion 60 spaced intermediate its axial ends which defines a tongue seated in the slot or groove 40 thus keying the split sleeve 54 to the the widing member 34 for rotation therewith.

With attention now invited to FIG. 4, it may be seen that rotation of the winding member 34 in a clockwise direction will cause that portion of the band 22 disposed immediately outwardly of the pocket 57 to be sharply bent so as to thus anchor that end of the band 22 to the winding member 34 for rotation therewith.

After the first end of the band 22 has been engaged with the slot 20 in the manner illustrated in FIG. 2 of the drawings and the other end of the band 22 has been seated in the pocket 57, the winding member 34 is turned by the head 38 thereof until the band 22 is tensioned as desired. Then, the threaded nut 56 may be tightened on the shank portion 36 so as to lock the winding member against rotation by the keying engagement of the washer 46 with the shank portion 36 and the head 38 and also with the recess 32 formed in the outer surface of the flange 14. Further, upon tightening the threaded nut 56, the split sleeve 54 will be tightly clamped between the flanges 14 and 16 and thus the winding member 34 will be keyed against rotation.

With attention now invited more specifically to FIG. 3, there may be seen a second form of mounting bracket referred to in general by the reference numeral 10' and which is substantially identical to the mounting bracket 10 and to whose similar parts corresponding prime numerals have been given. The bracket 10' differs from the bracket 10 in that the base 12' has been somewhat elongated and the flanges 14 and 16' are generally rectangular in configuration and include center extensions 24' provided with mounting apertures or bores 26'. Further, each of the flanges 14' and 16' includes a pair of opposite end bores 30'. The operation of the bracket 10' is substantially identical except that the pair of flange extensions 24' may be suitably butt welded to any suitable supporting surface, either vertical or horizontal.

In addition, inasmuch as both of the flanges 14' and 16' include pairs of opposite end bores 30', the winding member 34' may be disposed at either end of the base 12'.

With attention now invited to FIG. 6 of the drawings it may be seen that the base 12' may have its flange extensions 24' bent into coplanar relation for suitable securement, to a planar support surface by means of fasteners secured through the bores 26'.

With attention now invited more specifically to FIG. 7 of the drawings, there may be seen a modified form of split sleeve referred to by the reference numeral 54' and which includes an out and backturned terminal 58' defining a tangentially opening pocket 56' similar to the pocket 56. In addition, the other terminal end of the split sleeve 54' is turned inwardly as at 60 to form a tongue similar to tongue 60. Thus, it may be seen that the split sleeve 54' may be utilized in the same manner as the split sleeve 54. Of course, both of the split sleeves 54 and 54' may be reversed in end to end relation so as to enable the winding member 34 as well as the winding member 34' to be rotated in opposite directions when tightening the band or banding member 22.

With attention directed to FIG. 5 of the drawings it may be seen that the mounting bracket 10' may be utilized in conjunction with a threaded bolt-type fastener 70 secured through the set of aligned bores 30' through which the winding member 34 does not extend. When a threaded fastener 70 is utilized, the band or banding member 22 may be wrapped two or more times about the base 12' and the material to be banded to the base or mounting bracket.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. In combination, an elongated flexible tension member and an elongated base adapted for securement to a support member, one end of said base and a first end of said tension member including coacting means anchoring said first end to said one end, a rotary winding member journalled from the other end of said base for rotation about an axis extending transversely thereof, the second end of said tension member being anchored to said winding member for adjustable winding thereon, said elongated base including a pair of longitudinally extending laterally outwardly projecting flanges, said rotary winding member including a shank-type member journalled between said flanges, said shank type member and the outer surface of one of said flanges including first and second coacting means, respectively, interlockingly engageable with each other upon shifting toward each other axially of said shank type member to prevent rotation of the latter relative to said one flange, said shank-type member having a longitudinally extending and laterally outwardly opening slot formed therein, said first member including a lock annulus disposed on said shank-type member and including an inwardly directed tongue slidingly disposed in said slot.

2. The combination of claim 1 wherein said annulus is disposed outwardly of said one flange and includes axially projecting portions, said second means including outwardly opening recesses formed in the outer surface of said one flange about said shank-type member in which said axially projecting portions are receivable.

3. In combination, an elongated flexible tension member and an elongated base adapted for securement to a support member, one end of said base and a first end of said tension member including coacting means anchoring said first end to said one end, a rotary winding member journalled from the other end of said base for rotation about an axis extending transversely thereof, the second end of said tension member being anchored to said winding member for adjustable winding thereon, said elongated base including a pair of longitudinally extending laterally outwardly projecting flanges, said rotary winding member including a shank-type member journalled between said flanges, said shank-type member extending through said flanges and including diametrically enlarged portions on its opposite end portions disposed in opposing relation with the remote surfaces of said flanges, said enlarged portions being axially shiftable along said shank-type member, whereby said enlarged portions may clamp said flanges therebetween, and a sleeve member disposed on said shank-type member, snugly received between said flanges and keyed to said shank-type member for rotation therewith, said sleeve including means defining a generally tangentially opening pocket, said tension member comprising a stiff but bendable strap-like member, one terminal end of said strap-like member being disposed in said pocket.

4. The combination of claim 3 wherein said sleeve is longitudinally split including one out and backturned circumferentially terminal end defining said pocket.

5. The combination of claim 4 wherein said shank-type member is provided with a longitudinally extending laterally outwardly opening slot, the other terminal end of said sleeve being turned inward and keyed in said slot.

6. The combination of claim 3 wherein said sleeve includes an outwardly struck portion disposed intermediate its axial ends defining said pocket.

7. The combination of claim 6 wherein said shank-type member is provided with a longitudinally extending laterally outwardly opening slot, said sleeve including an inwardly struck portion keyed in said slot.

8. The combination of claim 1 wherein one of said flanges includes an apertured outer extension adapted for securement to a supporting surface by means of a fastener secured through said apertured extension and to said supporting surface.

9. The combination of claim 1 wherein said flanges include apertured outer extensions for securement to a suitable support surface.

10. The combination of claim 9 wherein said outer extensions are bendable relative to the portions of said flanges adjacent said base into coplanar relation.

11. In combination, an elongated flexible tension member, an elongated base, one end of said base and a first end of said tension member including coacting means anchoring said first end to said one end, the other end of said base including a pair of opposite side generally parallel flanges, a transverse rotary winding member journalled through said flanges, a sleeve member disposed on said winding member, keyed to the latter for rotation therewith and snugly received between said flanges, said rotary winding member including diametrically enlarged portions on its opposite ends disposed in opposing relation with remote surfaces of said flanges and axially shiftable relative to each other along the axis of rotation of said winding member, whereby said enlarged portions may clamp said flanges therebetween and the latter may clamp said sleeve member therebetween, the second end of said tension member being anchored to said sleeve member for winding thereon.

References Cited

UNITED STATES PATENTS 3,290,010    12/1966    Holmes    254—161
3,416,763    12/1968    Moreno    248—361

ROY D. FRAZIER, Primary Examiner

J. F. FOSS, Assistant Examiner

U.S. Cl. X.R.

24—68, 269; 248—361; 254—161